(No Model.)

A. C. ESTABROOK.
DEVICE FOR MAKING COVERED EYELETS.

No. 564,602.　　　　　　　　　Patented July 28, 1896.

UNITED STATES PATENT OFFICE.

ALANSON C. ESTABROOK, OF NORTHAMPTON, MASSACHUSETTS.

DEVICE FOR MAKING COVERED EYELETS.

SPECIFICATION forming part of Letters Patent No. 564,602, dated July 28, 1896.

Application filed December 2, 1895. Serial No. 570,772. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Devices for Making Covered Eyelets, of which the following is a specification, reference being had therein to the accompanying drawings.

Figure 1:
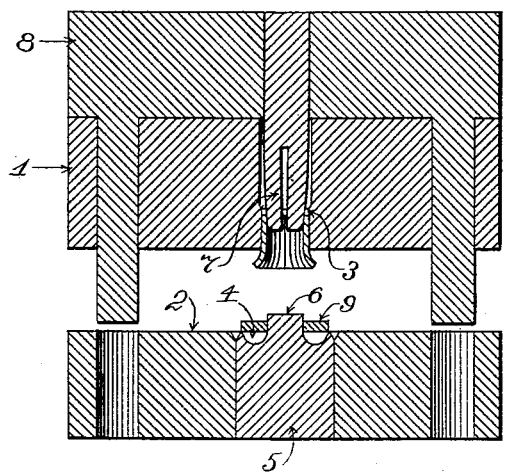
Figure 2:
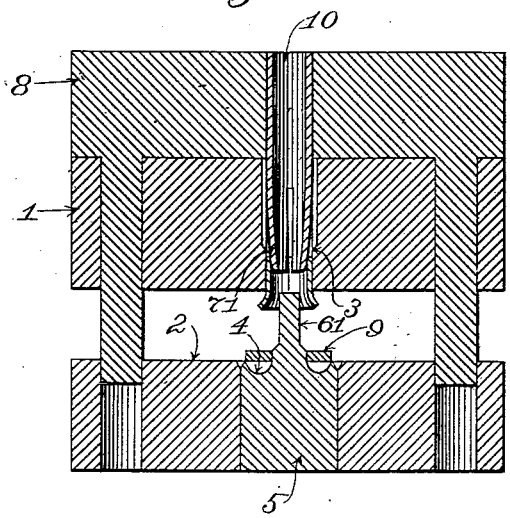

Figure 1 of the said drawings shows in vertical section a form of molding devices upon which my present invention is an improvement. Fig. 2 is a similar view illustrating my improvement.

In the manufacture of covered eyelets there is employed for the purpose of molding heads or coverings of plastic materials upon the flanged ends of the eyelets a pair of mold-plates or die-plates, such as those which are shown at 1 2 in each of Figs. 1 and 2. One of such plates, namely, that designated 1 in the said figures, is formed with a hole 3 for the reception of the body or barrel of the eyelet which is to have a head or covering of plastic material molded thereupon. The other plate, namely, that designated 2, either is formed with a circular recess 4, corresponding in conformation with the head or covering to be molded upon the eyelet, or is provided with a die 5, set in a hole therein and having the said recess formed therein. For the purpose of molding properly the inner or throat portion of the said head or covering a raised projection or pin 6, Fig. 1, is provided at the center of the circular recess 4, the said pin, when the two plates are brought together in the operation of molding, passing into the throat or opening of the eyelet that is contained in the hole 3 of the plate 1. For the purpose of holding the eyelet in the said hole 3 prior to and during the molding operation and also retaining it therein when the plates are separated after the conclusion of the molding operation, so as to detach and separate said eyelet and its head or covering from the recess and pin of plate 2, it has been proposed to employ in connection with plate 1 a split pin 7, the same having the split end thereof located within the said hole 3, as shown in Fig. 1, so that when the barrel of an eyelet is forced into the hole it will pass around the said split end and onto the same to a sufficient distance to enable the pin to hold the eyelet in place through the elasticity of its parts and their frictional engagement with the interior surface of the eyelet. The pin 7 is fixed in a plate 8, which latter is shown in Figs. 1 and 2 as resting against the plate 1. After plate 1 has been raised from plate 2, taking with it the eyelet, the disengagement of the split pin from the said eyelet is effected by separating the plate 8 from plate 1, whereby the pin 7 is partially withdrawn from the hole 3, leaving the eyelet free to fall or be shaken or brushed from the said hole.

A disadvantage incident to the use of the split pin as it heretofore has been proposed to be made is that the length of the central pin or projection 6 thereby is limited, inasmuch as the latter must not be long enough to project into the hole or throat of the eyelet far enough to strike against the end, of the split pin. Should it strike the said end this would render it impossible to press the mold-plates or die-plates together perfectly, and therefore the molding of the head or covering of the eyelet would be defective. Hence, in practice, so far as I am aware, the pin or projection 6 has been made long enough, only to receive a washer 9 of plastic material thereon, as shown in Fig. 1. The limited length of the said pin renders it very difficult and inconvenient to apply to the pin the washer which is to be molded on the end of the eyelet. It also renders such washer liable to become dislodged. In a prior application for Letters Patent of the United States, filed by me July 13, 1895, Serial No. 555,865, I have described a means and method of punching a washer from a sheet or strip of plastic material and depositing it at the same operation upon the pin of the plate 2. It is impossible to utilize the means and method just referred to in connection with the pin of Fig. 1, because the latter is too short to enable it to be utilized in punching, and because also it is impossible to retain the washer on such pin.

My present invention is in the nature of an improvement on the device of Fig. 1. The object thereof is to permit the use of a pin of a length which is sufficient to render it capable of being used in practising the earlier invention that is set forth in my prior application aforesaid, and also capable of efficiently retaining in place the washers of plastic material, which are to be molded onto the eyelets.

In the improved construction which is represented in Fig. 2 the split pin of Fig. 1 is retained. The said pin, which in this view is marked 71, however, is bored out or made hollow, as shown in Fig. 2, and thereby is fitted to receive within its interior the upper end of the central pin of die 5, designated 61 in Fig. 2. The said upper end is reduced sufficiently in diameter to enter the bore 10 of the pin 71. This construction enables me to form the pin 61 of sufficient length to serve for punching out the centers of the washers of plastic material, as described in my application aforesaid, and also for the efficient retention of the washers thereon during the handling of the mold-plates, &c.

It will be understood, of course, that although in Figs. 1 and 2 I have shown the devices as constructed to mold the head upon a single eyelet, in practice the molding devices are constructed to operate upon a large number of eyelets at a time.

I claim as my invention—

The combination with a pair of molds, one thereof having a hole to receive the barrel of an eyelet, and the other coöperating therewith in molding a head or covering on said eyelet, and having a central pin extending into the throat of the eyelet, of a hollow or open retaining device entering into the hole aforesaid and engaging with the interior surface of the eyelet to retain the latter in place, and also receiving within its own opening the upper end of the said central pin, substantially as described.

In testimony whereof I affix my signature in presence of two witnesses.

ALANSON C. ESTABROOK.

Witnesses:
FRANK N. LOAK,
JANET L. ELLIOT.